United States Patent
Quan et al.

(10) Patent No.: US 10,968,125 B2
(45) Date of Patent: Apr. 6, 2021

(54) NON-DISSOLVED REDOX MEDIATOR BIOFILM CARRIER AND ITS PREPARATION METHOD

(71) Applicant: Dalian University of Technology, Dalian (CN)

(72) Inventors: Xie Quan, Dalian (CN); Yanjun Mao, Dalian (CN); Wuzhe Quan, Dalian (CN); Shuo Chen, Dalian (CN); Hongtao Yu, Dalian (CN)

(73) Assignee: DALIAN UNIVERSITY OF TECHNOLOGY, Dalian Liaoning (CN)

( * ) Notice: Subject to any disclaimer, the term of this patent is extended or adjusted under 35 U.S.C. 154(b) by 79 days.

(21) Appl. No.: 15/777,393

(22) PCT Filed: Oct. 25, 2016

(86) PCT No.: PCT/CN2016/103243
§ 371 (c)(1),
(2) Date: May 18, 2018

(87) PCT Pub. No.: WO2017/177656
PCT Pub. Date: Oct. 19, 2017

(65) Prior Publication Data
US 2019/0144316 A1    May 16, 2019

(30) Foreign Application Priority Data

Apr. 13, 2016 (CN) .......................... 201610227682.9

(51) Int. Cl.
| | | |
|---|---|---|
| *C02F 3/10* | (2006.01) | |
| *C01B 32/198* | (2017.01) | |
| *C02F 1/72* | (2006.01) | |
| *C02F 3/00* | (2006.01) | |
| *C02F 101/30* | (2006.01) | |

(52) U.S. Cl.
CPC ............ *C02F 3/106* (2013.01); *C01B 32/198* (2017.08); *C02F 3/107* (2013.01); *C01B 2204/22* (2013.01); *C02F 1/725* (2013.01); *C02F 2003/001* (2013.01); *C02F 2101/308* (2013.01)

(58) Field of Classification Search
None
See application file for complete search history.

(56) References Cited

FOREIGN PATENT DOCUMENTS

| | | |
|---|---|---|
| CN | 103657611 A | 3/2014 |
| CN | 104195129 A | 12/2014 |
| CN | 104826505 A | 8/2015 |
| CN | 105668767 A | 6/2016 |
| CN | 105776503 A | 7/2016 |
| KR | 20160026287 A | 3/2016 |

OTHER PUBLICATIONS

CN104195129 Feng et al.—Immobilized algal toxin enzyme, prep method & application (Abstracts & MT; Dec. 10, 2014; 24 pages). (Year: 2014).*
CN102585335 Weitao et al.—Preparing polyethylene-graphene composite material (Abs A MT; Jul. 12, 2012; 17 pages). (Year: 2012).*

* cited by examiner

*Primary Examiner* — Hayden Brewster
(74) *Attorney, Agent, or Firm* — Muncy, Geissler, Olds & Lowe, P.C.

(57) ABSTRACT

The invention, belonging to the field of biological treatment of pollutants and functional materials, presents a non-dissolved redox mediator biofilm carrier and its preparation method. The graphene oxide and/or carbonylation modified graphene oxide are used as the non-dissolved redox mediator, which is called as the functional material, and the extrusion grade polyethylene/polypropylene particles are used as the basic material. The non-dissolved redox mediator biofilm carrier is prepared by the screw extrusion process, which is a simple, flexible and controllable method, and possesses strong adaptability. The reactor with these biofilm carriers has high removal efficiency of refractory organic pollutants.

4 Claims, No Drawings

NON-DISSOLVED REDOX MEDIATOR BIOFILM CARRIER AND ITS PREPARATION METHOD

TECHNICAL FIELDS

The present invention related to a non-dissolved redox mediator biofilm carrier and its preparation method, is applied to the biological treatment of environmental pollutants, and is particularly suitable for the biological wastewater treatment, and belongs to the field of biological treatment of pollutants and functional materials.

BACKGROUND ART

Refractory organic pollutants are those that can hardly be degraded by microorganisms, or have a very long time required for degradation. They are easily accumulated in natural media such as water bodies and soils, such as halogenated compounds, monocyclic aromatic compounds, phenols, phthalates, polycyclic aromatic hydrocarbons, nitrogen compounds, polychlorinated biphenyls, organochlorine insecticides, organophosphorus insecticides, urethane insecticides and herbicides. Their environmental hazards have been the world's concern. Control of refractory organic pollutants is an important issue in the field of water pollution prevention and control. Recent studies have shown that the addition of artificial redox mediators can accelerate the biodegradation of refractory organic pollutants and shorten the degradation time. Therefore, the redox mediator has potential application value and been caused more and more attention worldwide.

TECHNICAL PROBLEMS

The redox mediator can transfer electrons through its own redox capacity, which mainly involved in microbial extracellular electron transfer process to accelerate the electron transport rate. Hence the degradation rate of pollutants could be significantly improved. At present, the commonly used redox mediators mainly include some quinone, phenazine, phthalocyanine and so on. These compounds have $\pi$-$\pi$ conjugated systems and have active sites for the gain/loss of electrons, such as carbonyl (C=O). However, these compounds are soluble, and it is necessary to add these compounds from time to time during the biological water treatment process, which will result in an increase of operation cost, and secondary pollution also. Graphene possesses both $\pi$-$\pi$ conjugated systems and insolubility, and some of the fractions at their edges, such as carbonyl, can provide active sites for the gain/loss of electrons. However, the relative content of these active sites is lower, which restricts its application as a redox mediator in the biological wastewater treatment. Therefore, it is necessary to carbonylate the surface functional groups of graphene to provide a large number of active sites for gain/lose electrons, thereby improving its performance as a redox mediator. However, if it is directly used as a redox mediator, there is a problem of loss. It will also result in the increase of operation cost and secondary environment pollution. Based on the above, the object of the present invention is to develop a non-dissolved redox mediator biofilm carrier by mixing the non-dissolved redox mediator with the basic material.

SOLUTIONS

In order to address the problems above, the object of the present invention is to develop a non-dissolved redox mediator biofilm carrier by mixing the non-dissolved redox mediator with the basic material.

The non-dissolved redox mediator biofilm carrier, is characterized in that the non-dissolved redox mediator biofilm carrier is made of the non-dissolved redox mediator called as functional material, and the basic material. The non-dissolved redox mediator is the graphene oxide and/or carbonylation modified graphene oxide, and the basic material is extrusion grade polyethylene/polypropylene particles. The non-dissolved redox mediator biofilm carrier, is characterized in that the mass ratio of the functional material to the basic material is lower than 1:2.5.

The preparation method for the non-dissolved redox mediator biofilm carrier, features some steps as follows:

(1) The surface carbonylation modification of graphene oxide: 1) The pH of graphene oxide dispersion is adjusted by ammonia water to the range of 8-12. After that, the dispersion hydrothermally reacted at 60-100° C. for 3-9 hours, and then cooled down and dried (T≤60° C.). The solid particles are referred as N-GO; 2) The solid particles N-GO obtained from the step 1), are added to the water, and uniformly dispersed by ultrasonication, then the dispersion is added with the oxidant (dichromate) under the conditions of the addition of acid ($H_2SO_4$ or $HNO_3$) and ice water bath, fully stirred for more than 3 hours and dried. The solid particles obtained by above steps are the carbonylation modified graphene oxide, and called as Q-GO. The mass ratio of N-GO to water, acid and oxidant is 1:50-150:20-60:3-8.

(2) The preparation method for non-dissolved redox mediator biofilm carrier: 1) The non-dissolved redox mediator material is ultrasonically dispersed in the solvent (water, ethanol or dimethylformamide), and mixed with the added basic material, and then soaked for 1-4 hours, stirred every half an hour to make the redox mediator fully contact with the basic material in the solvent, and the resulting solid mixture is dried at 60-80° C. The non-dissolved redox mediator, as the functional material, is the graphene oxide and/or carbonylation modified graphene oxide; 2) The solid mixture is melt extruded by a screw extruder. The processing temperature of each section of the screw extruder is 120° C. to 190° C. to ensure that the basic material is fully mixed with the non-dissolved redox mediator material in the molten state, and can be shaped into carriers.

ADVANTAGES OF THE INVENTION

The non-dissolved redox mediator biofilm carrier is prepared by the screw extrusion process, which is a simple, flexible and controllable method, and possesses strong adaptability. The reactor with these biofilm carriers has high removal efficiency for refractory organic pollutants.

DETAIL EXAMPLES FOR INVENTION

Some examples are given to further illustrate the details of the non-dissolved redox mediator biofilm carrier and its preparation method. It should be emphasized that this invention is not confined to these examples as follows.

EXAMPLE 1

The surface carbonylation modification of graphene oxide: 1) The pH of graphene oxide dispersion is adjusted by ammonia water to 10. The dispersion is hydrothermally reacted at 90° C. for 6 hours, and then cooled down and dried (T=60° C.). The solid particles obtained are referred as N-GO; 2) The 0.2 g solid particles N-GO obtained from the step 1), are added to the water (20 mL), and uniformly dispersed by ultrasonication, and then 1.2 g potassium dichromate is added into the dispersion under the condition of the addition of acid ($H_2SO_4$ 5 mL) and ice water bath. After fully stirred for 3 hours and dried, the solid particles are obtained. They are carbonylation modified graphene oxide, and called as Q-GO.

The changes after modification of the groups and the relative contents of the graphene oxide are analyzed by X-ray photoelectron spectroscopy (XPS). The results show that the surface of the graphene oxide contains carbonyl (C=O), hydroxyl (—OH), carboxyl (—COOH) and ether (—O—). The relative percentage of C=O, C—O and C—OH is calculated by the peak area. The results show that the relative content of C=O increased from 8% to 50% after modification, and C—O and C—OH are reduced from 63% to 30% and from 30% to 20%, respectively, indicating that the C=O content of graphene oxide increases significantly after carbonylation modification.

EXAMPLE 2

Preparation of the non-dissolved redox mediator biofilm carrier and experiments about the treatment of methyl orange dye wastewater: The non-dissolved redox mediator material is ultrasonically dispersed in the water, and mixed with the basic material added with the mass ratio of the mediator material to the basic material being 1:100, and then soaked for 2 hours, stirred every half an hour to make the redox mediator fully contact with the basic material in the water, and the resulting solid mixture is dried at 80° C. The solid mixture is melt extruded by a screw extruder. The processing temperature of each section of the screw extruder is 135° C., 145° C., 155° C. and 130° C., respectively, to ensure that the basic material is fully mixed with the non-dissolved redox mediator material in the molten state, and can be shaped into carriers. The biofilm carriers are prepared by extrusion, cooling, traction, incision and shaping.

The decolorization and COD removal efficiency of methyl orange dye wastewater, treated by active sludge (without carriers) process, and moving bed biofilm reactor (with polyethylene carriers, unmodified graphene oxide and carbonylation modified carriers, respectively), are investigated at the HRT of 8 h, and the packing ratio of the carriers in the moving bed biofilm reactor is 30%. In the absence of microorganisms, the adsorption experiments of methyl orange in water are carried out with different kinds of carriers. The results show that the adsorption of dyestuff on the polyethylene carriers, unmodified graphene oxide or carbonylation modified carriers in the reactors is not obvious, and the removal rate is less than 1%. The results of biodegradation of methyl orange show that when the influent methyl orange concentration is 786-808 mg/L, the effluent methyl orange concentrations in different reactors are 324-337 mg/L (activated sludge), 226-237 mg/L (polyethylene carriers), 127-133 mg/L (unmodified graphene oxide carriers), and 10-12 mg/L (carbonylation modified carriers), respectively, with the average removals of 59% (activated sludge), 71% (polyethylene carriers), 84% (unmodified graphene oxide carriers), and 98% (carbonylation modified carriers), respectively. The decolorization efficiency is in the increased order of activated sludge, polyethylene carrier, unmodified graphene oxide carriers, and carbonylation modified carriers. When the influent COD concentration is 1167-1239 mg/L, the average removals of COD is 63% (activated sludge), 68% (polyethylene carriers), 70% (unmodified graphene oxide carriers), and 85% (carbonylation modified carriers), respectively, suggesting that the reactor equipped with carbonylation modified carriers has higher COD removal efficiency. Therefore, the non-dissolved redox mediator biofilm carriers can significantly accelerate the extracellular electron transport process of microorganisms on the surface of carriers, which can enhance the biodegradability of refractory pollutants.

We claims:

1. A preparation method for a non-dissolved redox mediator biofilm carrier, comprising the following steps:
    1) adjusting a pH of a first dispersion of the graphene oxide to 8-12 by using ammonia water, thereafter the dispersion is having hydrothermal reaction at 60-100° C. for 3-9 hours, and then cooling down and drying the dispersion at a temperature less than or equal to 60° C. to obtain solid N-GO particles;
    2) adding the solid N-GO particles obtained in step 1) to water, and uniformly dispersing by ultrasonication to obtain a second dispersion, then adding an oxidant to the second dispersion under acidic condition in ice-water bath, stirring for 3 hours and drying to obtain carboxylation modified graphene oxide Q-GO solid particles; wherein the mass ratio of N-GO, water, acid and oxidant is 1:50-150:20-60:3-8;
    3) ultrasonically dispersing the non-dissolved redox mediator material in a solvent to obtain a third dispersion, then adding a basic material to the third dispersion and soaking it for 1-4 hours, including stirring every half an hour to make the redox mediator fully contact with the basic material, then drying the third dispersion at 60-80° C. to obtain a solid mixture;
    wherein the non-dissolved redox mediator, as the functional material, is the graphene oxide and/or carboxylation modified graphene oxide;
    wherein the basic material is extrusion grade polyethylene/polypropylene particles;
    4) extruding the solid mixture obtained in step 3), by using a screw extruder; the processing temperature of each section of the screw extruder is 120° C. to 190° C. to ensure that the basic material is fully mixed with the non-dissolved redox mediator material in a molten state, for melt extrusion molding;
    wherein the non-dissolved redox mediator biofilm carrier, comprises:
    a non-dissolved redox mediator as a functional material, and
    a basic material;
    the non-dissolved redox mediator is graphene oxide and/or carbonylation modified graphene oxide, and the basic material is extrusion grade polyethylene/polypropylene particles;
wherein the mass ratio of the functional material to the basic material is lower than 1:2.5.

2. The preparation method for the non-dissolved redox mediator biofilm carrier, according to claim 1, wherein the acid is $H_2SO_4$ or $HNO_3$, and the oxidant is dichromate.

3. The preparation method for the non-dissolved redox mediator biofilm carrier, according to claim 1, wherein the solvent is water, ethanol or dimethylformamide.

4. The preparation method for the non-dissolved redox mediator biofilm carrier, according to claim 2, wherein the solvent is water, ethanol or dimethylformamide.

* * * * *